(12) United States Patent
Jones et al.

(10) Patent No.: US 7,599,333 B2
(45) Date of Patent: Oct. 6, 2009

(54) WIRELESS MESSAGING PREAMBLES ALLOWING FOR BEAMFORMING AND LEGACY DEVICE COEXISTENCE

(75) Inventors: Vincent K. Jones, Redwood City, CA (US); D. J. Richard van Nee, De Meern (NL); Albert van Zelst, Woerden (NL)

(73) Assignee: Qualcomm Incorporated, San Diego, CA (US)

( * ) Notice: Subject to any disclaimer, the term of this patent is extended or adjusted under 35 U.S.C. 154(b) by 472 days.

(21) Appl. No.: 11/351,279

(22) Filed: Feb. 8, 2006

(65) Prior Publication Data

US 2006/0193340 A1 Aug. 31, 2006

Related U.S. Application Data

(60) Provisional application No. 60/651,292, filed on Feb. 8, 2005.

(51) Int. Cl.
*H04W 4/00* (2006.01)
(52) U.S. Cl. .................. 370/334; 370/350; 375/316
(58) Field of Classification Search .......... 370/229, 370/235, 310, 343, 328, 329, 331, 332, 334, 370/345, 349, 351, 389, 392, 464, 465, 466, 370/467; 375/130, 140, 141, 144, 147, 148, 375/259, 260, 267; 379/414, 416; 455/1, 455/39, 63.1, 73, 91, 101, 103, 114.2, 550.1, 455/561, 562.1

See application file for complete search history.

(56) References Cited

U.S. PATENT DOCUMENTS 7,400,643 B2 * 7/2008 Hansen et al. ............. 370/465
2002/0118635 A1    8/2002 Nee
2002/0163933 A1   11/2002 Benveniste
2004/0114546 A1    6/2004 Seshadri et al.
2004/0242273 A1 * 12/2004 Corbett et al. ........... 455/562.1
2005/0152314 A1 *  7/2005 Sun et al. .................... 370/334
2005/0180360 A1 *  8/2005 Hansen et al. ............. 370/334
2005/0237992 A1 * 10/2005 Mishra et al. .............. 370/349
2005/0281241 A1 * 12/2005 Webster et al. ............. 370/343
2006/0088120 A1 *  4/2006 Hansen et al. ............. 375/267

OTHER PUBLICATIONS

Mujtaba, Aon et al, "TGn Sync Proposal", IEEE 802.11-04/888r0, Aug. 2004.*
International Search Report dated Aug. 24, 2007 for PCT Application Serial No. PCT/US 06/04634, 2 Pages.

* cited by examiner

*Primary Examiner*—Seema S Rao
*Assistant Examiner*—Khoa Huynh
(74) *Attorney, Agent, or Firm*—Turocy & Watson, LLP (57) ABSTRACT

A modified preamble is used by extended devices that operate in mixed mode environments and green field environments, to accommodate beamforming of transmissions. In one process, an extended wireless device processes data for transmission of that data as a packet, wherein the extended wireless device is a device configured to communicate using a standard protocol understood by each node device and an extended protocol not understood by legacy node devices. If the packet is to be directed at an extended device, the extended wireless device sends a preamble of that packet that is usable in an extended mode at extended devices and usable at a receiving legacy device to determine that the receiving legacy device is not the destination of data to follow the preamble. Once the receiving legacy device is expected to be deferring the network, the extended wireless device can beamform its signal or otherwise vary from the legacy protocol in communications with extended devices.

18 Claims, 13 Drawing Sheets

| | | | | | |
|---|---|---|---|---|---|
| TX1: | $SS_{20}$ | $LS_{20}$ | SIG-MM | $LS_{20}$ | SIG-N | $LS_{20}$ |
| TX2: | $SS_{20}$(3.0 us cs) | $LS_{20}$(3.0 us cs) | SIG-MM 3.0 us cs | $LS_{20}$(1.6 us cs) | SIG-N 1.6 us cs | $LS_{20}$(1.6 us cs) |
| TX3: | $SS_{20}$(3.1 us cs) | $LS_{20}$(3.1 us cs) | SIG-MM 3.1 us cs | $LS_{20}$(100 ns cs) | SIG-N 100 ns cs | $-LS_{20}$(100 us cs) |
| TX4: | $SS_{20}$(100 ns cs) | $LS_{20}$(100 ns cs) | SIG-MM 100 ns cs | $LS_{20}$(1.7 us cs) | SIG-N 1.7 us cs | $-LS_{20}$(1.7 us cs) |
| | 8us | 8us | 4us | 8us | 4us | 8us |

Fig. 7

| TX1: | $SS_{20}$ | $LS_{20}$ | SIG-MM | SIG-N | $SS_{20}$ half | $LS_{20}$ | $LS_{20}$ |
|---|---|---|---|---|---|---|---|
| TX2: | $SS_{20}$ (3.0 us cs) | $LS_{20}$ (3.0 us cs) | SIG-MM 3.0 us cs | SIG-N 3.0 us cs | $SS_{20}$ half 400 ns cs | $LS_{20}$ (1.6 us cs) | $-LS_{20}$ (1.6 us cs) |
| | 8us | 8us | 4us | 4us | 4us | 8us | 8us |

Fig. 8

| TX1: | $SS_{20}$ | $LS_{20}$ | SIG-MM | SIG-N | $SS_{20}$ half | $LS_{20}$ | $-LS_{20}$(1.6 us cs) |
|---|---|---|---|---|---|---|---|
| TX2: | $SS_{20}$(3.0 us cs) | $LS_{20}$(3.0 us cs) | SIG-MM 3.0 us cs | SIG-N 3.0 us cs | $SS_{20}$ half 400 ns cs | $LS_{20}$(1.6 us cs) | $LS_{20}$ |
| | 8us | 8us | 4us | 4us | 4us | 8us | 8us |

Fig. 9

| SS$_{20}$ | LS$_{20}$ | SIG-MM | SIG-N | SS$_{20}$half | LS$_{20}$ | LS$_{20}$ | LS$_{20}$ | LS$_{20}$ |
|---|---|---|---|---|---|---|---|---|
| SS$_{20}$(3.0 us cs) | LS$_{20}$(3.0 us cs) | SIG-MM 3.0 us cs | SIG-N 1.6 us cs | SS$_{20}$half 400 ns cs | LS$_{20}$(1.6 us cs) | LS$_{20}$(1.6 us cs) | LS$_{20}$(1.6 us cs) | -LS$_{20}$(1.6 us cs) |
| SS$_{20}$(3.1 us cs) | LS$_{20}$(3.1 us cs) | SIG-MM 3.1 us cs | SIG-N 100 ns cs | SS$_{20}$half 200 ns cs | LS$_{20}$(100 ns cs) | -LS$_{20}$(100 us cs) | -LS$_{20}$(100 us cs) | LS$_{20}$(100 us cs) |
| SS$_{20}$(100 ns cs) | LS$_{20}$(100 ns cs) | SIG-MM 100 ns cs | SIG-N 1.7 us cs | SS$_{20}$half 600 ns cs | LS$_{20}$(1.7 us cs) | -LS$_{20}$(1.7 us cs) | -LS$_{20}$(1.7 us cs) | LS$_{20}$(1.7 us cs) |
| 8us | 8us | 4us | 4us | 4us | 8us | 8us | 8us | 8us |

Fig. 10

| TX1: | $SS_{20}$ | $LS_{20}$ | SIG-N | $SS_{20}$ half | $LS_{20}$ | $LS_{20}$ |
|---|---|---|---|---|---|---|
| TX2: | $SS_{20}$ (400 ns cs) | $LS_{20}$ (1.6 us cs) | SIG-N 1.6 us cs | $SS_{20}$ half 400 ns cs | $LS_{20}$ (1.6 us cs) | $-LS_{20}$ (1.6 us cs) |
|  | 8us | 8us | 4us | 4us | 8us | 8us |

| TX1: | $SS_{20}$ | $LS_{20}$ | SIG-N | $-LS_{20}$ (1.6 us cs) |
|---|---|---|---|---|
| TX2: | $SS_{20}$ (400 ns cs) | $LS_{20}$ (1.6 us cs) | SIG-N 1.6 us cs | $LS_{20}$ |
| | 8us | 8us | 4us | 8us |

Fig. 14

| SS$_{20}$ | LS$_{20}$ | SIG-N | SS$_{20}$half | LS$_{20}$ | LS$_{20}$ | LS$_{20}$ | LS$_{20}$ |
|---|---|---|---|---|---|---|---|
| SS$_{20}$(400 ns cs) | LS$_{20}$(1.6 us cs) | SIG-N 1.6 us cs | SS$_{20}$half 400 ns cs | LS$_{20}$(1.6 us cs) | LS$_{20}$(1.6 us cs) | -LS$_{20}$(1.6 us cs) | -LS$_{20}$(1.6 us cs) |
| SS$_{20}$(200 ns cs) | LS$_{20}$(100 ns cs) | SIG-N 100 ns cs | SS$_{20}$half 200 ns cs | LS$_{20}$(100 ns cs) | LS$_{20}$(100 ns cs) | LS$_{20}$(100 ns cs) | -LS$_{20}$(100 ns cs) |
| SS$_{20}$(600 ns cs) | LS$_{20}$(1.7 us cs) | SIG-N 1.7 us cs | SS$_{20}$half 600 ns cs | LS$_{20}$(1.7 us cs) | -LS$_{20}$(1.7 us cs) | -LS$_{20}$(1.7 us cs) | LS$_{20}$(1.7 us cs) |
| 8us | 8us | 4us | 4us | 8us | 8us | 8us | 8us |

WIRELESS MESSAGING PREAMBLES ALLOWING FOR BEAMFORMING AND LEGACY DEVICE COEXISTENCE

CROSS-REFERENCE TO RELATED APPLICATIONS

The present application also claims benefit under 35 USC §119(e) of U.S. provisional application No. 60/651,292, filed Feb. 8, 2005, entitled "Wireless Messaging Preambles Allowing for Beamforming and Legacy Device Coexistence", the content of which is incorporated herein by reference in its entirety for all purposes.

U.S. patent application Ser. No. 11/140,349, filed May 27, 2005, entitled "Modified Preamble Structure for IEEE 802.11A Extensions to allow for Coexistence and Interoperability Between 802.11A", to Gardner et al. (hereinafter "Gardner"), assigned commonly with the present application, is incorporated herein by reference in its entirety for all purposes.

BACKGROUND OF THE INVENTION

Wireless networks have become increasingly popular, as computers and other devices can be coupled for data communications without requiring wired connections between the network nodes. One set of standards for wireless networks is the IEEE 802.11 standards, but other wireless standards or protocols might be used instead. Because wireless networks are expected to operate in unfavorable conditions, such as in the presence of reflections, interference, movement of receivers/transmitters, etc., much effort is needed to correctly transmit and receive data over a wireless channel.

A typical node in a wireless network (referred to in the standards as a "station") includes a receive chain and a transmit chain. A transmit chain typically includes some digital processing and analog circuitry (RF, baseband, etc.) that causes a signal to be transmitted into the wireless channel. A receive chain typically includes one or more antenna, RF circuitry and other analog circuitry, and digital processing that seeks to output a data stream that represents what the sending transmit chain received as its input and transmitted into the wireless network. Of course, where there are unrecoverable errors, there is a mismatch between what the sending transmit chain received and what the receiving receive chain outputs. In some cases, a receiver uses multiple antennas to improve reception of the signal and/or reduce errors from a sending transmit chain.

Because of the expected conditions, the receive chain includes various components designed to ensure that signals can be largely recovered correctly. Several techniques have been in use to recover signals. One technique is the use of MIMO (multiple-input, multiple-output) channels. MIMO is also used to increase bandwidth for given conditions and/or to improve reception without increased bandwidth.

In the IEEE 802.11 standards, there are at least two widely-used standards, 802.11a and 802.11b, and communication systems and devices might be required to support both standards and/or be required to operate in areas where both are being used. Enhancements to the 802.11 standards have been in place, such as the 802.11g standard that allows for OFDM transmissions (802.11a is an OFDM transmission protocol) in the 2.4 GHz band (the band used for 802.11b).

The 802.11a protocol supports OFDM transmissions in the 5 GHz band for data rates of 6 to 54 million bits per second ("Mbps"). The 802.11b protocol supports DSSS transmissions in the 2.4 GHz band for data rates of 1, 2, 5.5 and 11 Mbps. The 802.11g protocol mixes OFDM and DSSS protocols in the 2.4 GHz band for data rates of 1, 2, 5.5, 6, 9, 11, 12, 18, 24, 36, 48 and 54 Mbps. Data transmissions are well known for these protocols, so they need not be set forth herein. They are described, for example, in ANSI/IEEE Std 802.11, 1999 Edition; IEEE Std 802.11b, 1999; IEEE Std 802.11a, 1999/Amd 1:2000(E), IEEE 802.11g-2003 Amendment to IEEE Std 802.11, 1999. Those references are incorporated by reference herein for all purposes.

While 802.11a, 802.11b and the like standard wireless protocols are in use, even higher performances are now desired. The possible use of new protocols is complicated by the fact that newer protocol devices might have to coexist with legacy devices and should preferably not cause undesirable errors in legacy devices by their presence. In order to avoid conflicts, extended devices that extend beyond the limits of the standard and legacy devices that comply with an existing standard and are not necessarily aware of extended standards need to coexist in a common communication space.

Coexistence is where differing devices can operate in a common space and still perform most of their functions. For example, an extended transmitter transmitting to an extended receiver might coexist with a legacy transmitter transmitting to a legacy receiver and the extended devices can communicate while the legacy devices communicate, or at least where the two domains are such that one defers to the other when the other is communicating. Coexistence is important so that the adoption and/or use of extended devices (i.e., devices that are outside, beyond or noncompliant with one or more standards with which legacy devices adhere and expect other devices to adhere) do not require replacement or disabling of existing infrastructures of legacy devices.

Beamforming is a technique wherein a transmitter adjusts its signal such that the signal is stronger in some directions than in others. Where the overall power dissipation is the same, beamforming causes the signal in the favored directions to increase (providing increased robustness, range, etc.) while the signal in the disfavored directions decreases.

BRIEF SUMMARY OF THE INVENTION

A modified preamble is used by extended devices that operate using protocols that might differ from standards used by legacy devices. In such a "mixed mode" environment, the modified preamble is preferably such that a legacy device will interpret a packet as being a valid packet, but one that is not destined for that legacy device and will properly defer. In a "green field" environment, where all devices are aware of the modified protocol, that can be taken into account such that the preamble need not be constrained to be intelligible to the legacy device. Where beamforming is used, part of the packet (such as all or part of its preamble) might be sent omnidirectionally and the rest sent using beamforming. As a result, the packet protocol should be such that a receiver (and/or transmitter) can process the packet taking into account possible gain changes over the span of the packet.

The modified preamble preferably includes properties that facilitate such operations. The modified preambles may include modifications in one or more of the fields of a packet.

Thus, preambles might be such that newer protocol devices and legacy devices can coexist. Newer protocol devices might use beamforming to improve transmission, while allowing receivers (legacy and newer) to properly handle the signals, even if the receiver is a legacy receiver and does not need to receive the data being transmitted from a newer protocol receiver.

The following detailed description together with the accompanying drawings will provide a better understanding of the nature and advantages of the present invention.

DETAILED DESCRIPTION OF THE INVENTION

In embodiments of a communication system according to aspects of the present invention, novel preambles and other elements are presented.

The use of modified preambles is described herein. Such modified preambles can be used in packets sent over a wireless network, such as an 802.11a compliant wireless network. Such packets with modified preambles can be sent by transmitters according to embodiments of the present invention to be received by receivers according to embodiments of the present invention, as well as being received by legacy receivers that are not configured to receive and interpret the modified preambles as would be done with receivers according to embodiments of the present invention.

Figure 1:
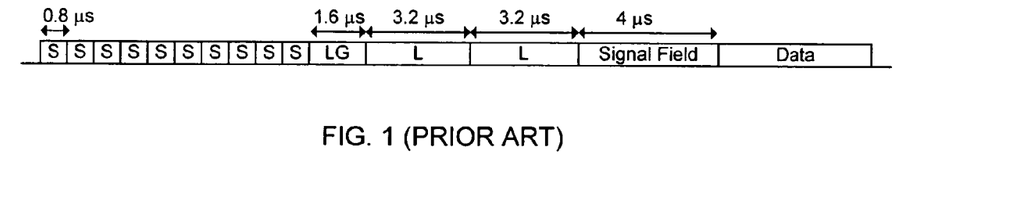
FIG. 1 illustrates the structure of a conventional 802.11a preamble.

The IEEE 802.11a standard defines a 20 microsecond long preamble with a structure as shown in FIG. 1, having short training symbols S (0.8 microseconds each), a guard interval LG, long training symbols L (3.2 microseconds each) and a signal field (4 microseconds). The preamble is followed by data. The first eight microseconds comprises ten identical short training symbols, S, that are used for packet detection, automatic gain control and coarse frequency estimation. The second eight microseconds comprise two identical long training symbols, L, preceded by a guard interval LG that is the same pattern as the last half (1.6 microseconds) of the long training symbol L. The long training symbols can be used for channel estimation, timing, and fine frequency estimation.

Figure 2:
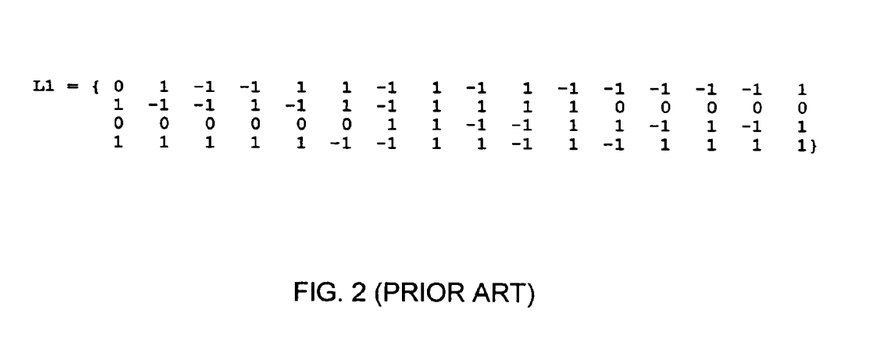
FIG. 2 shows the frequency-domain symbols, starting with the DC subcarrier, of a long training symbol sequence, $L_1$, used for a conventional 802.11a preamble.

FIG. 2 shows a long training sequence, $L_1$, that is used to generate the signal representing the long training symbol ("LTS") in a conventional 802.11a preamble. This sequence represents values used over a plurality of subcarriers. As specified in the standard, the subcarriers span a 20 MHz channel and with 64 subcarriers, they are spaced apart by 312.5 kHz. By convention, used here, the first value in the sequence is the value for the DC subcarrier, followed by the value for the 1×312.5 kHz subcarrier, then the value for the 2×312.5=625 kHz subcarrier, etc., up to the 32nd value for the 31×312.5 kHz=9687.5 kHz subcarrier. The 33rd value corresponds to the −10 MHz subcarrier, followed by the −(10 MHz−312.5 kHz) subcarrier, and so on, with the 64 value being for the −312.5 kHz subcarrier.

The output of a transmitter is a training symbol at a sample rate of 64 samples/symbol. The samples are obtained by taking a 64-point IFFT (inverse fast-Fourier transform) of the long training sequence, $L_1$ in this example. As used herein, a sequence in the frequency domain is expressed with uppercase letters (e.g., $L(k)$), while the corresponding time sequence is expressed with lowercase letters (e.g., $l(k)$).

Figure 3:
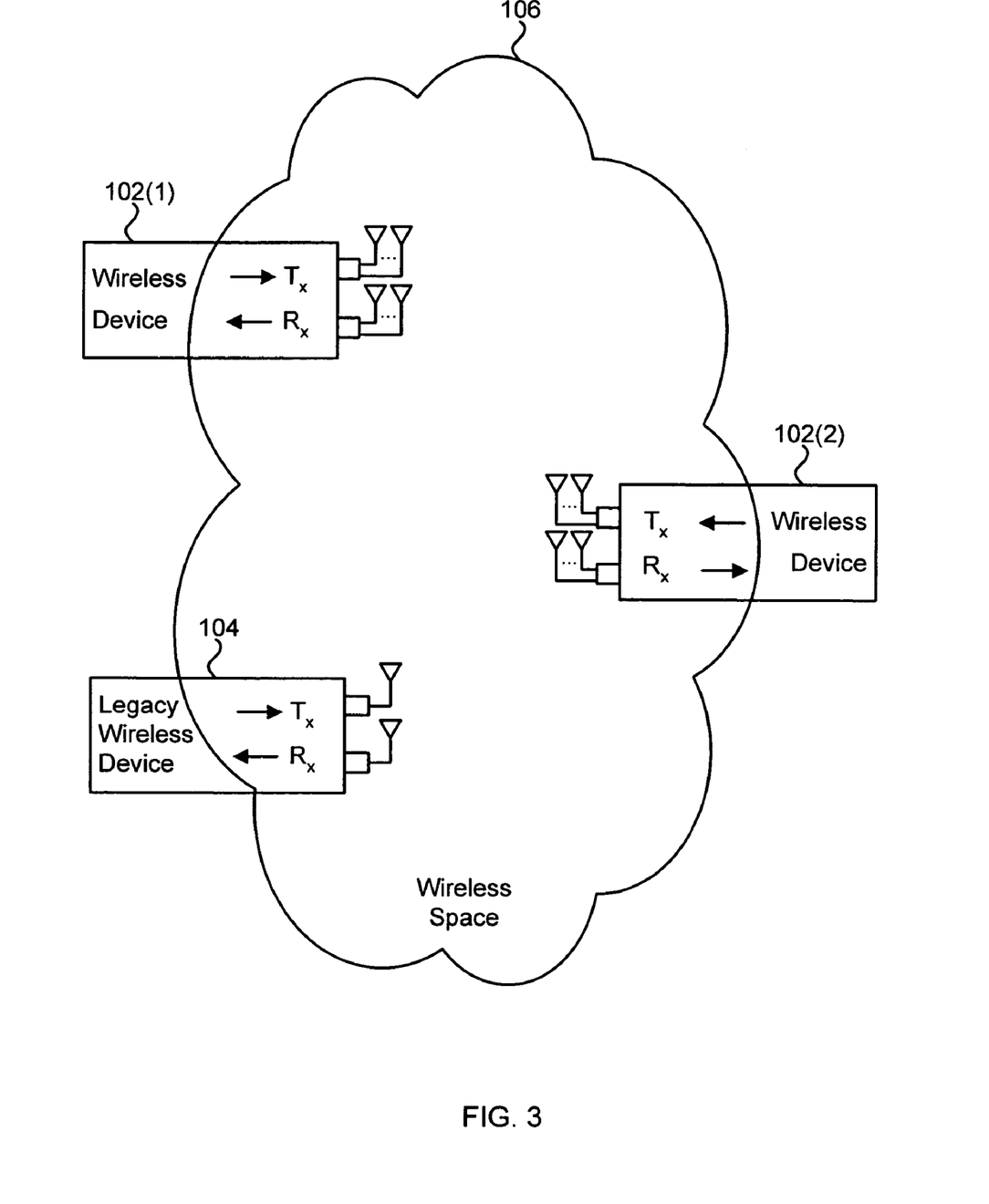
FIG. 3 illustrates several devices coupled via a wireless network.

FIG. 3 illustrates just one example of a wireless network being used for communications among transmitters and receivers as indicated. As shown, two wireless devices 102 (1), 102(2) might use and interpret the modified preambles, while a legacy wireless device 104 might not be expecting the modified preambles, but might hear signals representing such preambles. Extended wireless devices 102 might operate using multiple channels and/or multiple transmit antennas and/or multiple receive antennas. Devices might have a single transmit antenna and a single receive antenna, or more than one transmit antenna and/or more than one receive antenna. While separate transmit and receive antennas are shown, antennas might be used for both transmitting and receiving in some devices.

Border 106 is not a physical border, but is shown to represent a space within which signals can be received from devices within the space. Thus, as one device transmits a signal representing a packet within border 106, other devices within border 106 pick up the signals and, as they are programmed, will attempt to determine if the signals represent packets and if so, then demodulate/decode the packets to obtain the data represented therein.

The construction and components of a wireless device are well known and need not be presented here in detail. For example, the wireless device might have one or more antennas with a transmit section and a receive section. Each section might comprise an RF component, a baseband digital component, a signal processing component and a data handling component. The digital components might be implemented as instructions provided to a general purpose processor such as a digital signal processor or hardware dedicated to the process of executing digital signal processing instructions. For example, a preamble might be implemented as a stored sequence of instructions or data in a data table that the processor reads as it is to generate a signal to be transmitted or as it is interpreting a received signal.

Figure 4:
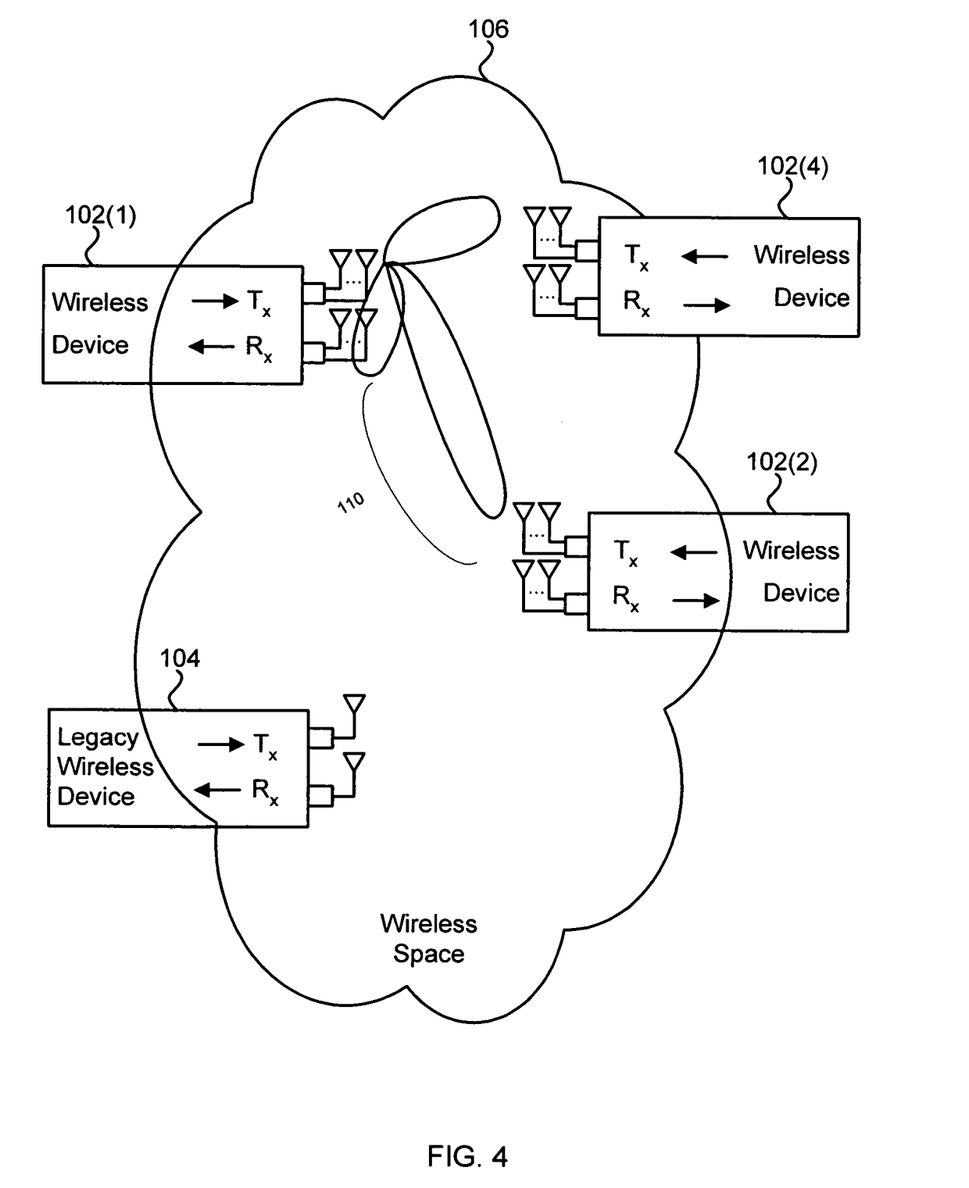
FIG. 4 illustrates several devices coupled via a wireless network, wherein at least one of the devices beamforms its transmission.

FIG. 4 illustrates the network of FIG. 3, with an additional wireless device 102(4). This wireless device 102(4) is an extended wireless device. Also shown in FIG. 4 is an example of a beam pattern 110, wherein the size of a node of beam pattern 110 roughly represents signal strength in a particular direction. In this example, the signal is weak from the transmitter of wireless device 102(1) to legacy wireless device 104, which would be desired when in an extended mode. The signal is likely stronger to wireless device 102(2) than if beamforming was not used, which is good when the communication path is between wireless device 102(1) and wireless device 102(2). The signal is weaker to wireless device 102(4), which should not be a problem if the traffic being beamformed is not for wireless device 102(4).

One concern is that a wireless device other than the one(s) in the strong node of the signal might not be able to have enough signal strength to determine whether the packet was intended for them. Preferably, nodes for which signals are not intended will not be confused and will not attempt to transmit.

Preferably, a modified preamble will be such that 1) an extended receiver (e.g., one that is aware of modified preambles) can receive different variations of modified preambles and deal with them accordingly, including channel estimation when beamforming is used, 2) a legacy receiver (e.g., one that is not configured to receive and interpret the modified preambles and might not expect extended operations) can receive enough of a packet to determine either that the legacy receiver can understand the packet or can defer processing of incoming signals for a time, thereby allowing a measure of coexistence, and 3) the modified preamble is synchronization and/or channel estimation as needed. In some embodiments of wireless devices according to the present invention, modified preambles are used that provide one, two or all of the preferable characteristics indicated above.

Some examples of preamble structures are shown herein and several satisfactory modified preamble structures can be derived by one of ordinary skill in the art after reading this disclosure.

Some IEEE 802.11 standards specify an energy detect based defer behavior, which provides some level of coexistence. However, to guarantee that legacy devices properly defer for all extended mode packets down to required received power levels, the receivers should be able to successfully decode the signal field even in the presence of beamforming that is disfavorable (i.e., points the beam away from) to the receiver, as the signal field contains the length information of the packet and is used to determine a deferral period.

A problem with some preambles is that they are not robust enough when beamforming (BF) is applied to the transmission, because channel estimation is more involved with BF present and there might not be enough preamble to allow for channel estimation. For example, where legacy devices are present and they do not deal with BF, part of the preamble should be not beamformed, to allow for the legacy device to understand at least a part of the preamble and then properly defer.

Where the transmitter provides a non-BF portion and then a BF portion of a preamble, the AGC should be redone for the BF portion, as the gain can be expected to change. Naturally, if it is known that no legacy devices are present ("green field" environment), the protocol can be simplified.

Preambles from an extended (i.e., nonlegacy) transmitter should be such that they do not "break" a legacy receiver. For example, changes to the preamble should be such that, where possible, the correlation detectors in legacy receivers do not break down, but instead listen to enough of the preamble to determine that the transmission is not for a legacy receiver to interpret. As an example of breakdown, some detectors cross the STS-LTS boundary and a different cyclic shift on the STS (short training symbol) and on the LTS (long training symbol) will break down such detectors.

As will be described below, there can be multiple modes, with different preambles for each mode. As an example, a wireless network could include a mixed mode space (MM) where extended and legacy devices coexist or could be limited to a green field (GF), where it is known that only extended devices are in range. For some transmissions, beamforming might be used, while in others it is not. With these possibilities, there are four possible modes:

1. Mixed Mode, with no beamforming
2. Mixed Mode, with beamforming
3. Green Field Mode, with no beamforming
4. Green Field Mode, with beamforming Additional variations might be needed, to account for other options, such as the number of transmit antennas. FIGS. 5-14 illustrate several examples of preambles that solve various problems. In many of these examples, the transmissions are assumed to be in 20 MHz channels, as with existing standards. However, these preambles can be extended for the 40 MHz channels. For example, the 40 MHz layout described in a WWiSE proposal draft IEEE doc. 802.11-04/0886r6 can be combined with the layout of the 20 MHz preambles shown herein.

Figure 5:
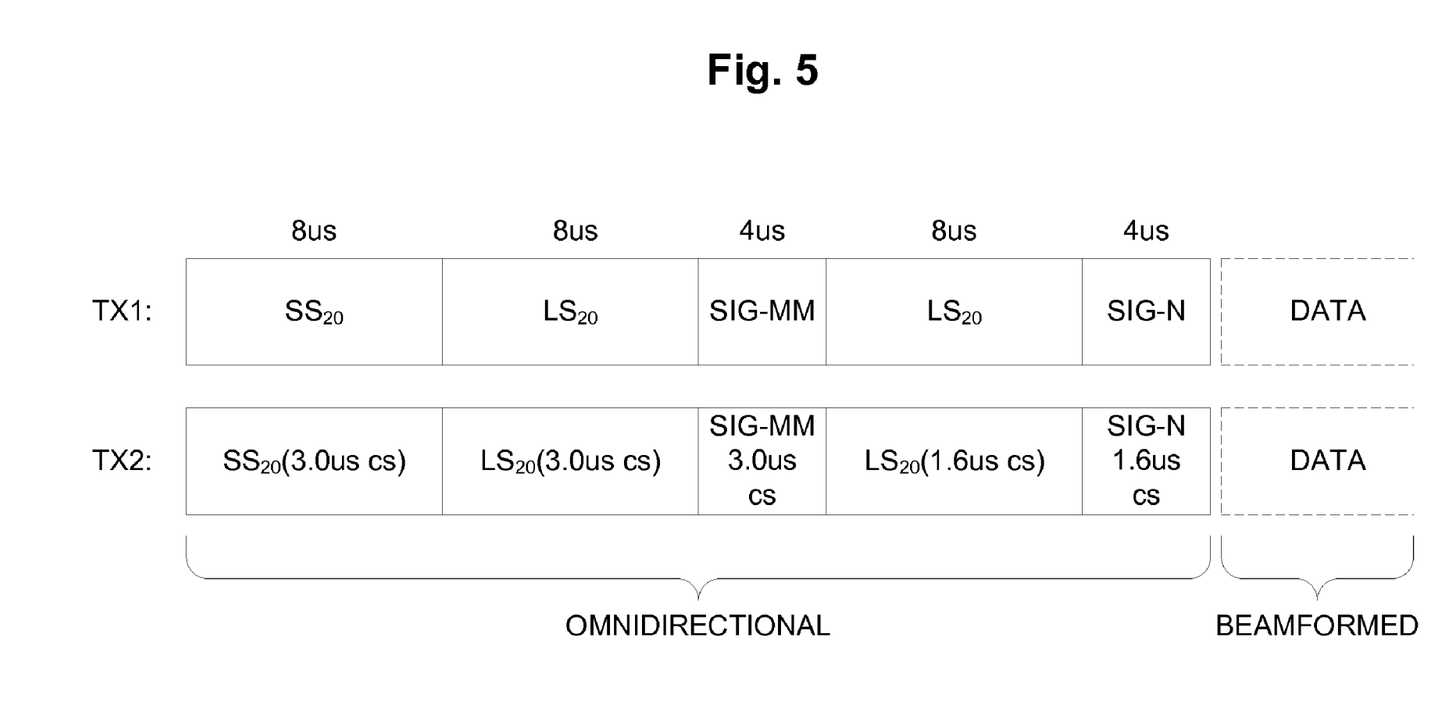
FIG. 5 illustrates a modified preamble usable in a mixed mode environment without beamforming with two transmit antennas.

In FIG. 5, preambles for a mixed mode with no beamforming and two transmit antennas (TX1, TX2) are shown. As illustrated there, $SS_{20}$ and $LS_{20}$ are conventional 802.11a (or the like) short symbols and long symbols, respectively. The short symbol comprises ten repetitions of an 800 nanosecond (nsec) sequence (8 microseconds total), while the long symbol comprises a 1.6 microsecond guard period, and two copies of a 3.2 microsecond sequence (for 8 microseconds total). The short and long symbols are followed by a SIG-MM field, which can be just an 802.11a SIGNAL field.

With appropriate selection of timing, a legacy detector can handle the preamble, even though it might not be able to understand the rest of the packet. This is often good enough, that the legacy detector be able to understand enough of the packet to determine that the packet is not directed at it and how long the packet transmission will last, so that the legacy device knows how long it should remain quiet. There is no need for the legacy device to understand the rest of the packet when an extended device only uses the modified preamble when sending to extended devices and a conventional preamble when sending to a legacy device.

In some implementations, the cyclic shift on the legacy portion of TX2 can be smaller, with a few extra short symbols (preferably 4 microseconds) after the SIG-MM field to allow for more time and samples for AGC adjustments. If beamforming is used, it can be applied to the packet fields that follow the SIG-N field after deferrals of other devices.

Note that a 3.0 microsecond cyclic shift, for a standard ten repetition short symbol, is a 200 nanosecond advance. Also, a 1.6 microsecond cyclic shift for a long symbol is a shift of exactly half the long symbol sequence.

Figure 6:
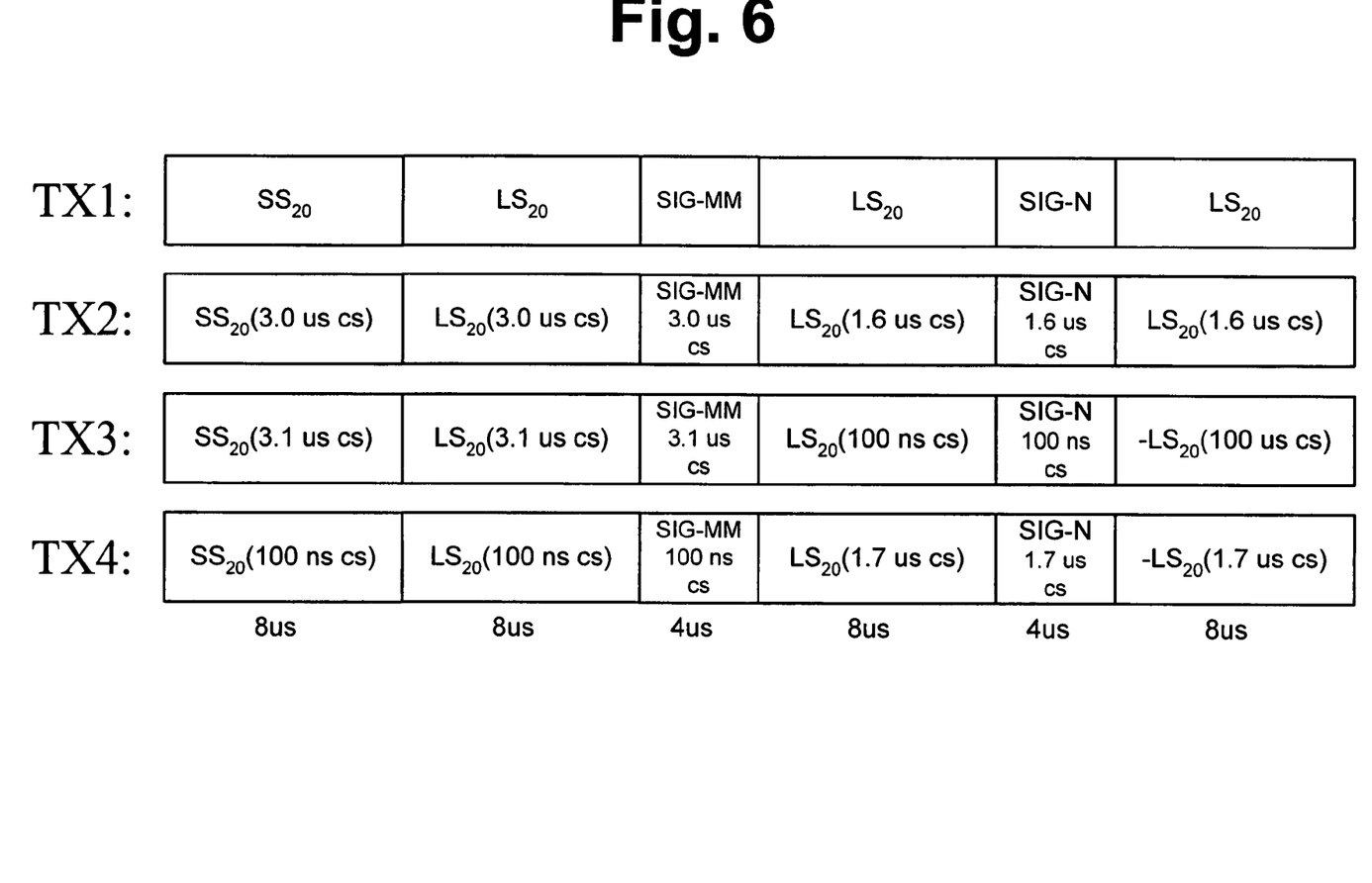
FIG. 6 illustrates a modified preamble usable in a mixed mode environment without beamforming with three or four transmit antennas (extendable to other values).

FIG. 6 shows preambles for a mixed mode with no beamforming and three or four antennas. Note that each of some of the fields is cyclically shifted by different amounts. For example, in the case of the short symbol, TX2 is advanced 200 nsec, TX3 is advanced 100 nsec, and TX4 is retarded 100 nsec (so that each is shifted by a quarter or a half of an 800 nanosecond sequence) and for the long symbol, TX2 is advanced/retarded by half the sequence, while TX3 and TX4 are shifted by different amounts. Other selections of amounts of advancement/retarding might be used instead. Following the SIG-N field, variations of the long symbol are sent (including the long symbol multiplied by −1 for TX3 and TX4).

The cyclic shift on the legacy portions of TX2, TX3 and TX4 can be made smaller, but then a few extra short symbols (preferably 4 microseconds) after the SIG-MM field to allow for more time and samples for AGC adjustments.

Figure 7:
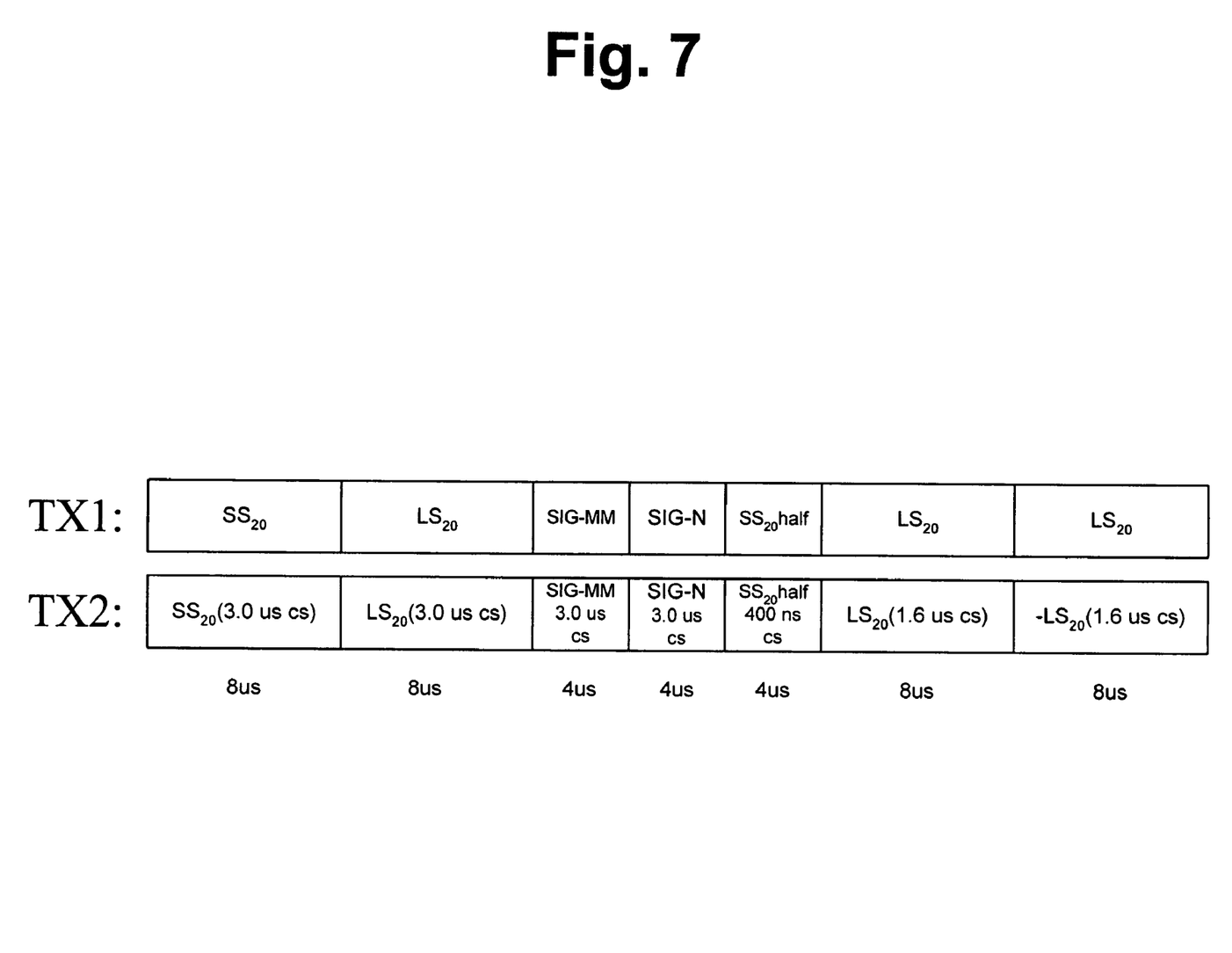
FIG. 7 illustrates a modified preamble usable in a mixed mode environment with beamforming and two transmit antennas.
Figure 8:
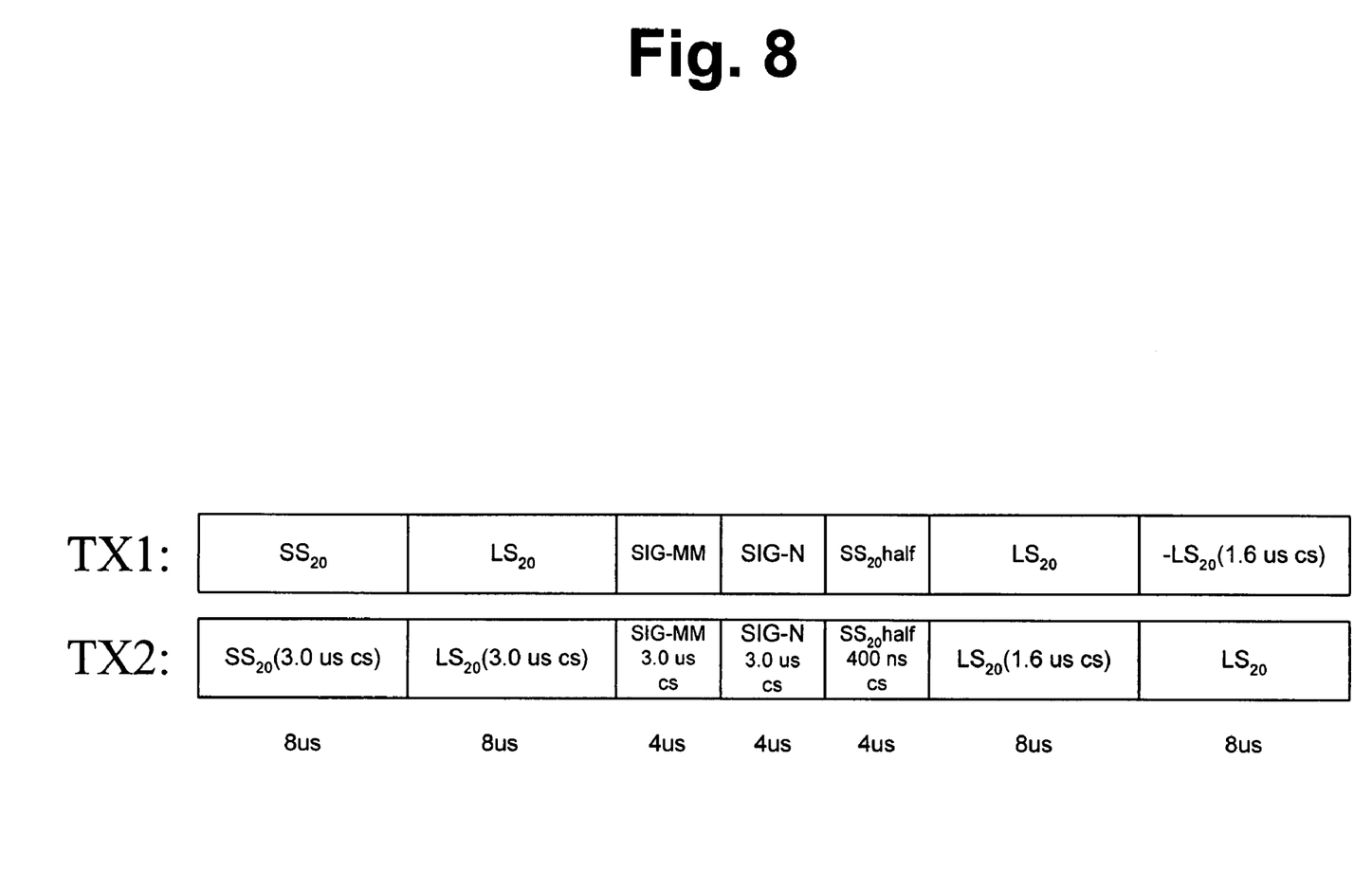
FIG. 8 illustrates another variation of a modified preamble usable in a mixed mode environment with beamforming and two transmit antennas.

FIGS. 7-8 illustrate mixed modes with beamforming for two transmitters in two variations. In each case, a short symbol "half field", $SS_{20}$, is used. The $SS_{20}$ half field can be just five repetitions of the standard short symbol 800 nsec sequence. In some transmitters, the half field is transmitted following the SIG-N field, as with the preamble of FIG. 7. Since a legacy device can be expected to have deferred at this point, the half field will not break a legacy device. This is one variation for a preamble for optional BF modes, and others are possible.

In some embodiments where beamforming is used, the signal is beamformed following the SIG-N field. The additional fields after the SIG-N field are usable for cyclic shift fixes, extra AGC steps and/or BF training. Hardware and control techniques for steering a signal and making it into a nonuniform beam might be conventional beamsteering hardware and control techniques known to those of ordinary skill in the art.

The SIG-N field preferably contains an extra bit to indicate that the preamble is for use in a beamformed mode. When a receiver notes this extra bit, it should expect to have to adjust the AGC (and possibly other channel parameters) as the beam changes shape if there is a non-beamformed legacy portion of the packet.

In the variation of FIG. 8, the assignment of shifted long symbol sequences is the opposite.

Figure 9:
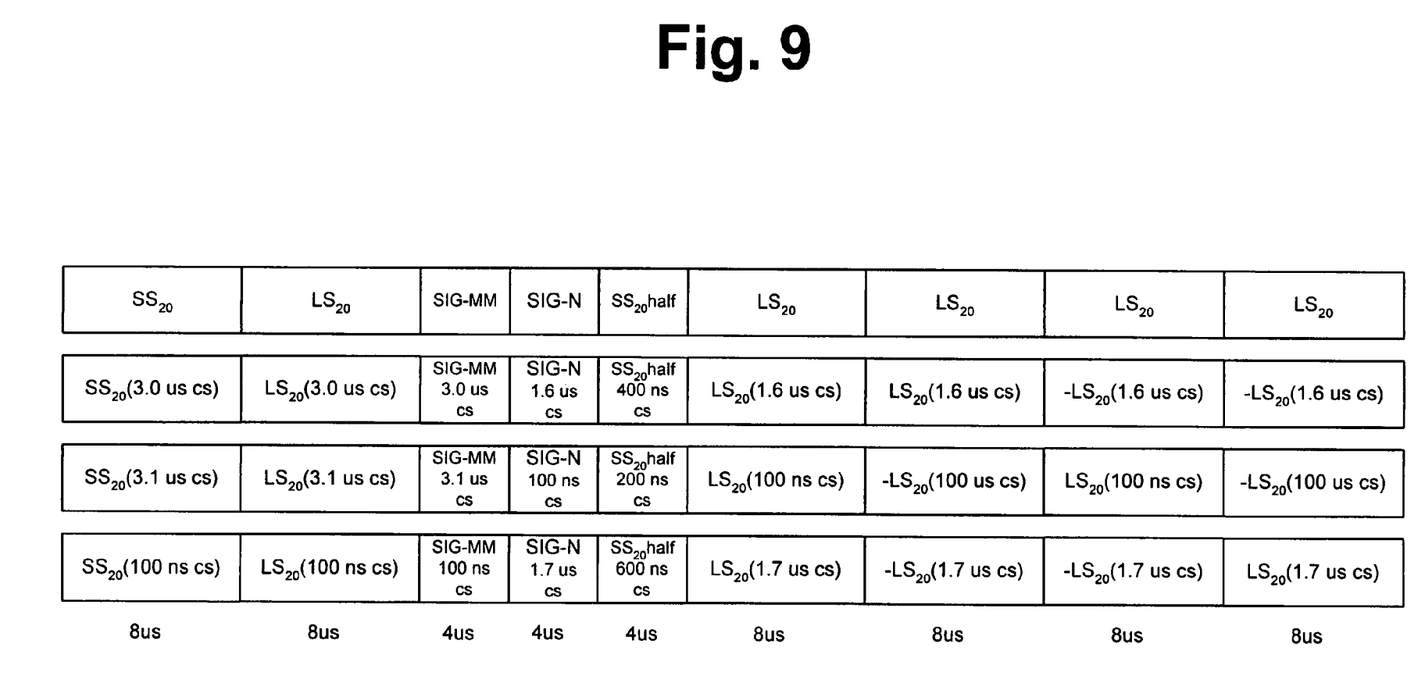
FIG. 9 illustrates a modified preamble usable in a mixed mode environment with beamforming with three or four transmit antennas (extendable to other values).
Figure 10:
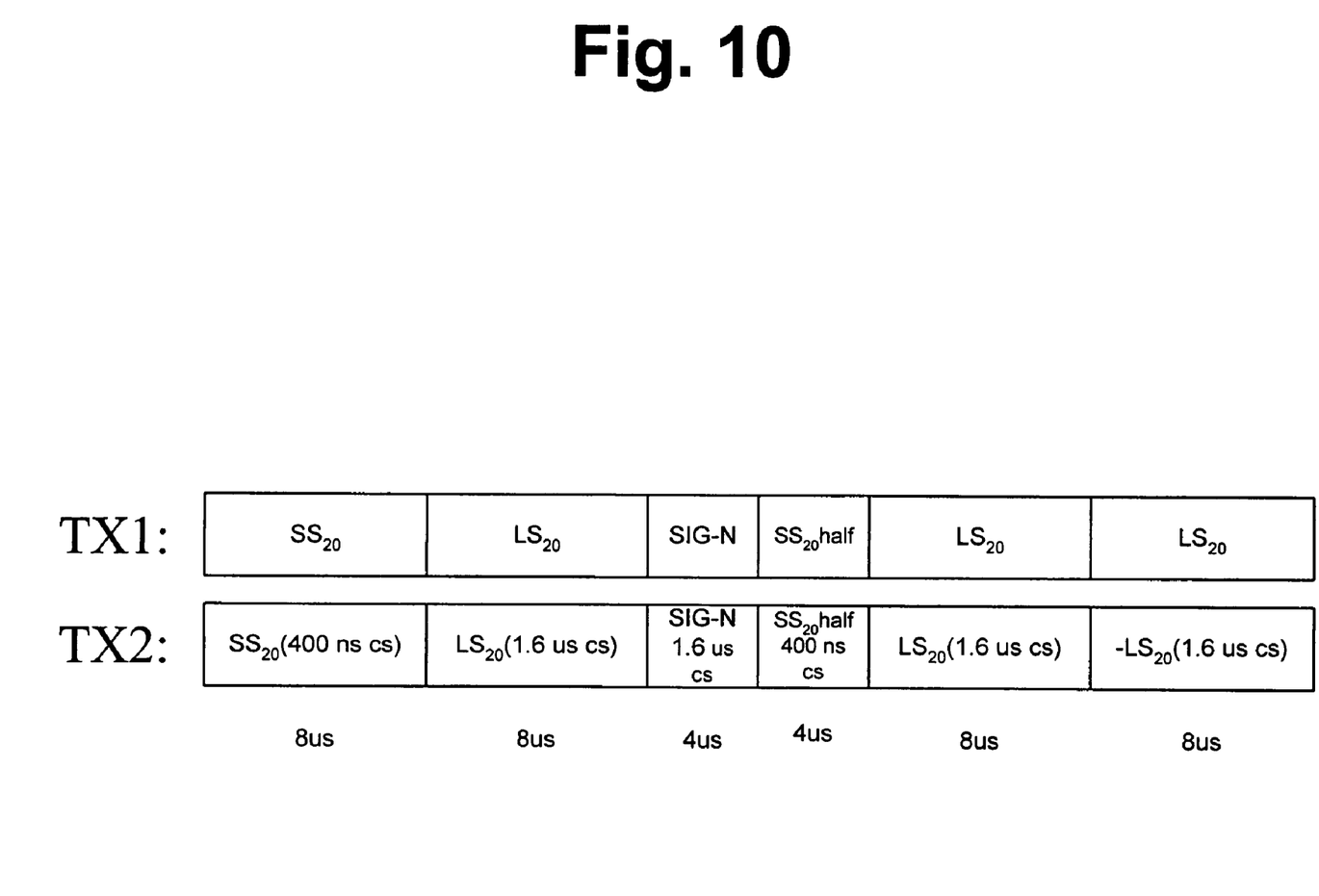
FIG. 10 illustrates a modified preamble usable in a green field environment with beamforming with two transmit antennas.

FIG. 9 illustrates preambles for a mixed mode with beamforming and three or four transmit antennas. A variation of those can be derived from FIG. 9 and the variations shown in FIGS. 7-8.

FIGS. 10-14 illustrate preambles used in green fields, i.e., where legacy devices do not exist or do not need to be considered. For a green field ("GF") and no beamforming ("BF"), perhaps no adjustments are required.

FIGS. 10-13 illustrate variations usable for GF/BF with two transmit antennas. The preamble includes extra AGC steps and BF training. The SIG-N field might contain extra bit to indicate that the preamble is for a beamformed mode, at least for the part following SIG-N, hence AGC should be adjusted (especially when the legacy part is assumed not beamformed) and frequency domain training should be done.

Figure 14:
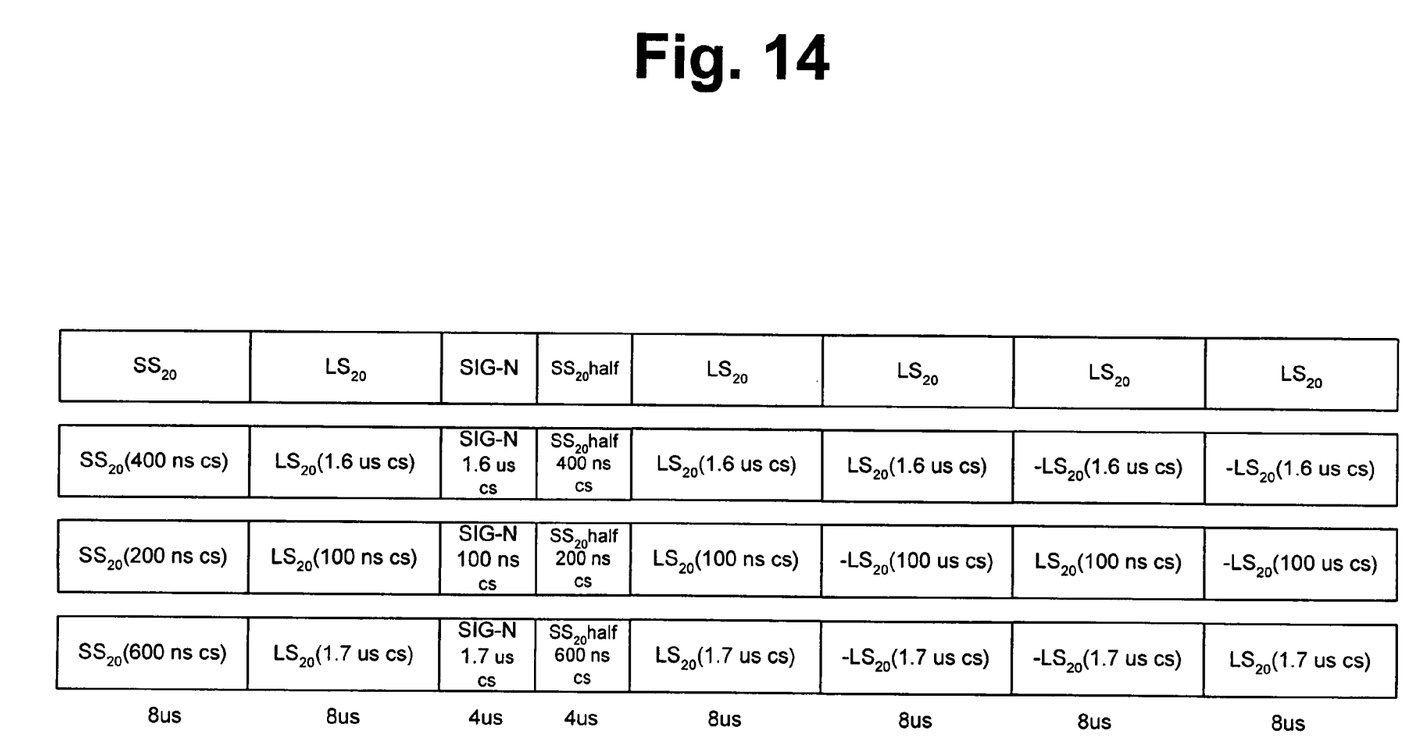
FIG. 14 illustrates a modified preamble usable in a green field environment with beamforming and three or four transmit antennas.

FIG. 14 illustrates preambles for GF/BF for three or four transmit antennas. Note that because a bit in the SIG-N field indicates that this is a beamformed preamble, the "GF/no BF" preamble does not have to be completed and frequency domain training can begin right away.

Figure 11:
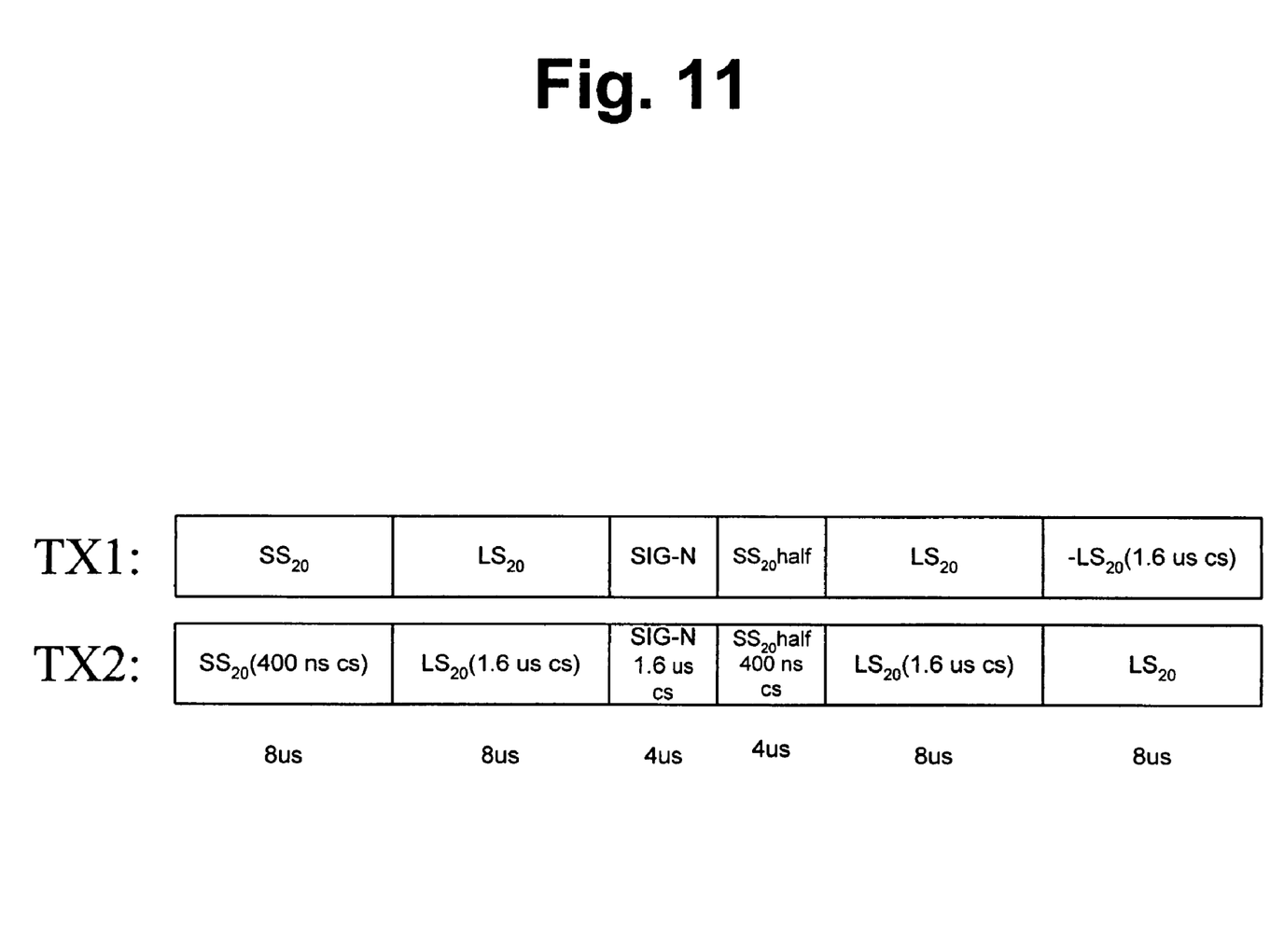
FIG. 11 illustrates another variation of a modified preamble usable in a green field environment with beamforming and two transmit antennas.
Figure 12:
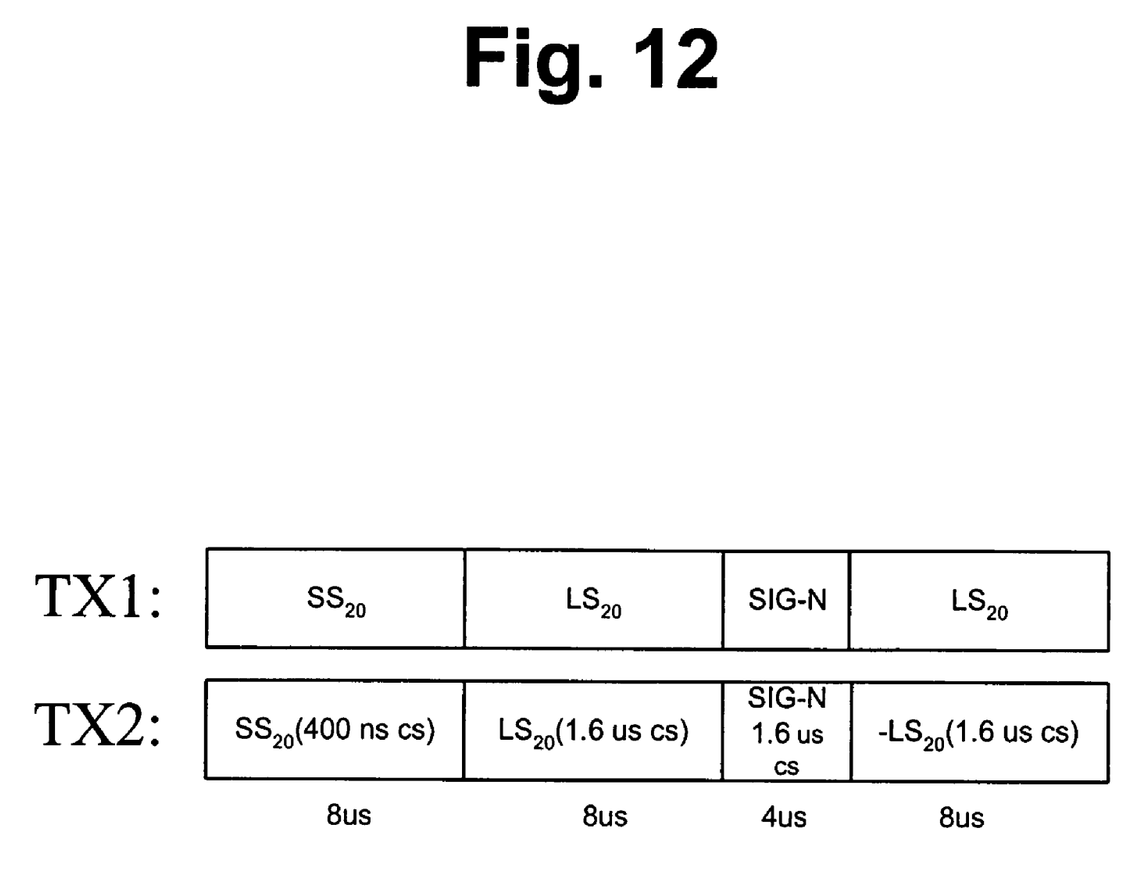
FIG. 12 illustrates yet another variation of a modified preamble usable in a green field environment with beamforming and two transmit antennas.
Figure 13:
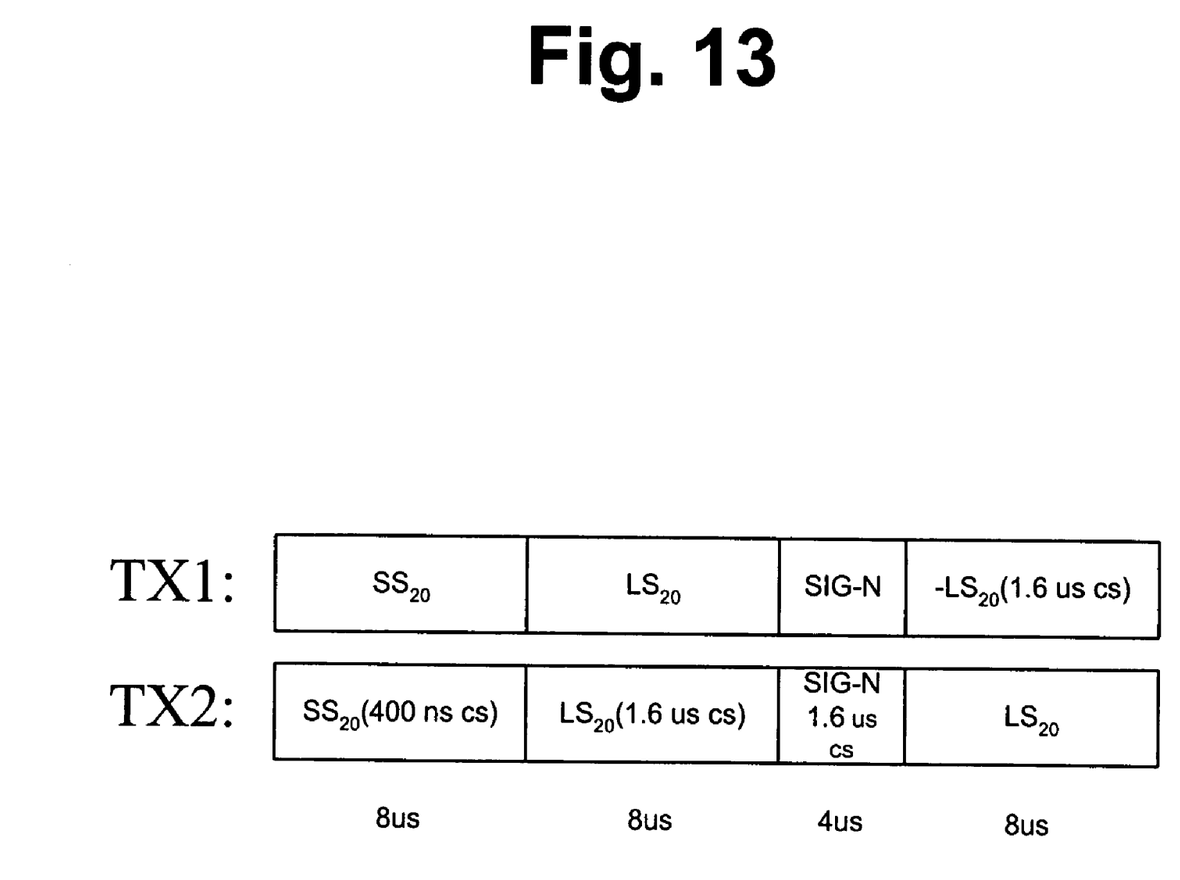
FIG. 13 illustrates yet another variation of a modified preamble usable in a green field environment with beamforming and two transmit antennas.

Variations similar to those shown in FIGS. 11-13 for the three or four transmit antennas cases can be derived by extension from what is shown in FIG. 14.

The above embodiments of the present invention are illustrative and not limiting. Various alternatives and equivalents are possible. The invention is not limited by the type of encoding, decoding, modulation, demodulation, equalization, filtering, etc., performed. The invention is not limited to the number of transmit or receive antennas. The invention is not limited by the rate used to transfer the data. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

While the invention has been described with respect to exemplary embodiments, one skilled in the art will recognize that numerous modifications are possible. For example, the processes described herein may be implemented using hardware components, software components, and/or any combination thereof. Where described herein, a plurality of antennas might comprise individual antennas, preferably spatially separated but not necessarily so, but a single physical antenna might be used for more than one transmit stream or receive signal through the use of polarization or other techniques.

Thus, although the invention has been described with respect to exemplary embodiments, it will be appreciated that the invention is intended to cover all modifications and equivalents within the scope of the following claims.

What is claimed is:

1. A method of transmitting signals in a wireless network comprising a plurality of wireless devices, the method comprising:

processing data by an extended wireless device for transmission of the data as a packet, wherein the extended wireless device communicates using a standard protocol understood by each wireless device and an extended protocol not understood by legacy wireless devices;

determining if the packet is to be directed at another extended wireless device or a legacy wireless device;

when the packet is to be directed at another extended wireless device, transmitting a preamble of the packet that is usable in an extended mode at extended wireless devices and usable at receiving legacy wireless devices to determine that the receiving legacy wireless devices are not the destination of data to follow the preamble, wherein the preamble contains a SIG-N field, the SIG-N field containing a bit indicating that portions of the packet following the SIG-N field are beamformed; and when the packet is to be directed at another extended wireless device, waiting until a time period when the receiving legacy wireless devices are expected to be deferring the network, and then beamforming other portions of the packet.

2. The method of claim 1, wherein the standard protocol is an 802.11a, 802.11b and/or 802.11g protocol.

3. The method of claim 1, wherein the preamble comprises a modified long training pattern distinct from a conventional 802.11 a long training pattern.

4. The method of claim 1, wherein at least a part of the preamble is transmitted using more than one of the plurality of transmit antennas such that it is receivable and processable by one or more receivers.

5. The method of claim 1, wherein at least a part of the preamble comprises one or more of a cyclically shifted short training sequence, a long training sequence or a signal field.

6. The method of claim 1, wherein the preamble is transmitted omnidirectionally.

7. A system for transmitting signals in a wireless network comprising a plurality of wireless devices, the system comprising:

an extended wireless device transmitting data as a packet, wherein the extended wireless device communicates using a standard protocol understood by each of a plurality of wireless devices and an extended protocol not understood by one or more legacy wireless devices of the plurality of wireless devices, the extended wireless device determining if the packet is to be directed at another extended wireless device or a legacy wireless device, wherein upon determining that the packet is to be directed to another extended wireless device, the extended wireless device transmits a preamble of the packet that is usable in an extended mode at extended wireless devices and usable at receiving legacy wireless devices to determine that the receiving legacy wireless devices are not the destination of data to follow the preamble, wherein the preamble contains a SIG-N field, the SIG-N field containing an indicator indicating that portions of the packet following the SIG-N field are beamformed, and the extended wireless device waits until a time period when the receiving legacy wireless devices are expected to be deferring the network, and then beamforms other portions of the packet.

8. The system of claim 7, wherein the standard protocol is an 802.11a, 802.11b and/or 802.11g protocol.

9. The system of claim 7, wherein the preamble comprises a modified long training pattern distinct from a conventional 802.11 a long training pattern.

10. The system of claim 7, wherein at least a part of the preamble is transmitted using more than one of the plurality of transmit antennas such that it is receivable and processable by one or more receivers.

11. The system of claim 7, wherein at least a part of the preamble comprises one or more of a cyclically shifted short training sequence, a long training sequence or a signal field.

12. The system of claim 7, wherein the preamble is transmitted omnidirectionally.

13. A system for transmitting signals in a wireless network comprising a plurality of wireless devices, the system comprising:

means for transmitting data as a packet, wherein the means for transmitting communicates using a standard protocol understood by each of a plurality of wireless devices and an extended protocol not understood by one or more legacy wireless devices of the plurality of wireless devices, the means for transmitting determining if the packet is to be directed at another extended wireless device or a legacy wireless device, wherein upon determining that the packet is to be directed to another extended wireless device, the means for transmitting transmits a preamble of the packet that is usable in an extended mode at extended wireless devices and usable at receiving legacy wireless devices to determine that the receiving legacy wireless devices are not the destination of data to follow the preamble, wherein the preamble contains a SIG-N field, the SIG-N field containing an indicator indicating that portions of the packet following the SIG-N field are beamformed, and the means for transmitting waits until a time period when the receiving legacy wireless devices are expected to be deferring the network, and then beamforms other portions of the packet.

14. The system of claim 13, wherein the standard protocol is an 802.11a, 802.11b and/or 802.11g protocol.

15. The system of claim 13, wherein the preamble comprises a modified long training pattern distinct from a conventional 802.11 a long training pattern.

16. The system of claim 13, wherein at least a part of the preamble is transmitted using more than one of the plurality of transmit antennas such that it is receivable and processable by one or more receivers.

17. The system of claim 13, wherein at least a part of the preamble comprises one or more of a cyclically shifted short training sequence, a long training sequence or a signal field.

18. The system of claim 13, wherein the preamble is transmitted omnidirectionally.

* * * * *

UNITED STATES PATENT AND TRADEMARK OFFICE
CERTIFICATE OF CORRECTION

PATENT NO. : 7,599,333 B2  Page 1 of 1
APPLICATION NO. : 11/351279
DATED : October 6, 2009
INVENTOR(S) : Jones et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 712 days.

Signed and Sealed this

Twenty-eighth Day of September, 2010

David J. Kappos
*Director of the United States Patent and Trademark Office*